(12) United States Patent
Yamanaka et al.

(10) Patent No.: US 8,792,725 B2
(45) Date of Patent: Jul. 29, 2014

(54) INFORMATION PROCESSING APPARATUS, CONTROL METHOD FOR INFORMATION PROCESSING APPARATUS AND STORAGE MEDIUM

(75) Inventors: Masao Yamanaka, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/421,278

(22) Filed: Mar. 15, 2012

(65) Prior Publication Data

US 2013/0064455 A1 Mar. 14, 2013

(30) Foreign Application Priority Data

Sep. 14, 2011 (JP) ................................. 2011-200973

(51) Int. Cl.
*G06K 9/46* (2006.01)
(52) U.S. Cl.
CPC ....................................... *G06K 9/46* (2013.01)
USPC ........... 382/195; 382/103; 382/118; 382/159; 382/181
(58) Field of Classification Search
CPC ................ G06T 7/0081; G06T 7/0087; G06T 2207/20076; G06T 2207/20148
USPC .......... 382/103, 118, 159, 170, 181, 190, 195
See application file for complete search history.

(56) References Cited

U.S. PATENT DOCUMENTS

| | | | | |
|---|---|---|---|---|
| 5,432,893 | A * | 7/1995 | Blasubramanian et al. | 345/600 |
| 5,987,170 | A * | 11/1999 | Yamamoto et al. | 382/170 |
| 6,512,846 | B1 * | 1/2003 | Luo | 382/165 |
| 6,597,801 | B1 * | 7/2003 | Cham et al. | 382/103 |
| 6,757,444 | B2 * | 6/2004 | Matsugu et al. | 382/283 |
| 6,804,683 | B1 * | 10/2004 | Matsuzaki et al. | 1/1 |
| 7,039,233 | B2 | 5/2006 | Mori et al. | |
| 7,054,850 | B2 | 5/2006 | Matsugu | |
| 7,274,819 | B2 | 9/2007 | Matsugu | |
| 7,483,548 | B2 * | 1/2009 | Nakano et al. | 382/103 |
| 7,577,297 | B2 | 8/2009 | Mori et al. | |
| 7,881,524 | B2 | 2/2011 | Matsugu et al. | |
| 7,912,253 | B2 | 3/2011 | Suzuki et al. | |
| 7,995,805 | B2 | 8/2011 | Suzuki et al. | |
| 8,130,281 | B2 | 3/2012 | Kaneda et al. | |
| 8,259,806 | B2 * | 9/2012 | Radhakrishnan et al. | 375/240.15 |

(Continued)

OTHER PUBLICATIONS

Yamanaka, et al. "Automatic Detection of Regions of Interest Based on Density Ratio Estimation", The Papers of Joint Technical Meeting on Information Processing and Innovative Industrial System, IEE Japan, IP-11-001 to 018, IIS-11-031 to 048, The Institute of Electrical Engineers of Japan (IEEJ), pp. 85-91, Mar. 25, 2011.

Ren, et al., "Learning a Classification Model for Segmentation.", Proc. IEEE International Conference on Computer Vision, pp. 10-17, 2003.

(Continued)

*Primary Examiner* — Vu Le
*Assistant Examiner* — Aklilu Woldemariam
(74) *Attorney, Agent, or Firm* — Fitzpatrick, Cella, Harper & Scinto (57) ABSTRACT

An information processing apparatus comprising a setting unit configured to set a plurality of local regions on an image; an extraction unit configured to extract feature amounts from the respective local regions; a calculation unit configured to calculate dissimilarities between the local regions based on probability densities for the respective feature amounts; and an integration unit configured to integrate the plurality of local regions as region groups based on the dissimilarities.

9 Claims, 7 Drawing Sheets

(56) References Cited

U.S. PATENT DOCUMENTS

| | | |
|---|---|---|
| 2006/0074653 A1 | 4/2006 | Mitari et al. |
| 2006/0115157 A1 | 6/2006 | Mori et al. |
| 2008/0152225 A1* | 6/2008 | Iwamoto .................... 382/190 |
| 2009/0324060 A1 | 12/2009 | Sato et al. |
| 2010/0091330 A1* | 4/2010 | Marchesotti et al. ........ 358/1.18 |
| 2010/0329556 A1 | 12/2010 | Mitarai et al. |
| 2011/0044543 A1* | 2/2011 | Nakamura et al. ............ 382/190 |
| 2011/0158535 A1 | 6/2011 | Iio et al. |
| 2011/0243398 A1* | 10/2011 | Suzuki et al. ................. 382/118 |
| 2012/0033853 A1 | 2/2012 | Kaneda et al. |
| 2012/0045120 A1 | 2/2012 | Tate et al. |
| 2012/0057791 A1 | 3/2012 | Mitarai et al. |
| 2012/0076417 A1 | 3/2012 | Yoshii et al. |

OTHER PUBLICATIONS

Chen, "The lamda-connected segmentation and the optimal algorithm for split-and-merge segmentation", Chinese J. Computers, 14, pp. 321-331, 1991.

Sharon, et al., "Fast Multiscale Image Segmentation", Proc. IEEE Computer Vision and Pattern Recognition, pp. 70-77, 2000.

Hido, et al., "Statistical Outlier Dectection Using Direct Density Ratio Estimation.", Knowledge and Information Systems, vol. 26, No. 2, pp. 309-336, 2011.

Kanamori, et al., "A Least-squares Approach to Direct Importance Estimation", Journal of Machine Learning Research, 10:1391-1445, Jul. 2009.

* cited by examiner

INFORMATION PROCESSING APPARATUS, CONTROL METHOD FOR INFORMATION PROCESSING APPARATUS AND STORAGE MEDIUM

BACKGROUND OF THE INVENTION

1. Field of the Invention

The present invention relates to an information processing apparatus, a control method for the information processing apparatus, and a storage medium and, more particularly, to an information processing apparatus which executes region segmentation of an image, a control method for the information processing apparatus, and a storage medium.

2. Description of the Related Art

An image is divided into regions, and the region segmentation result is applied to various image processing applications. For this purpose, a technique for appropriately dividing an image is demanded. As an appropriate region segmentation method of an input image, a method described in X. Ren, J. Malik, "Learning a classification model for segmentation", Proc. IEEE International Conference on Computer Vision, pp. 10-17, 2003. has been proposed. X. Ren, J. Malik, "Learning a classification model for segmentation", Proc. IEEE International Conference on Computer Vision, pp. 10-17, 2003. discloses a technique of attaining region segmentation of an image by expressing an image by a data structure called a graph and reducing that structure to an energy minimization problem.

Also, as another appropriate region segmentation method of an input image, a method described in L. Chen, "The lambda-connected segmentation and the optimal algorithm for split-and-merge segmentation", Chinese J. Computers, 14 (1991), pp. 321-331 has been proposed. L. Chen, "The lambda-connected segmentation and the optimal algorithm for split-and-merge segmentation", Chinese J. Computers, 14 (1991), pp. 321-331 discloses a technique for attaining region segmentation by combining segmentation and integration of an image. With this technique, an image is recursively divided into small partial regions until low-order feature amounts in a predetermined region have uniform properties during a division process, and these partial regions are integrated to be grown to polygons in an integration process, thus attaining region segmentation of an image.

However, in case of the region segmentation method based on the graph theory like in X. Ren, J. Malik, "Learning a classification model for segmentation", Proc. IEEE International Conference on Computer Vision, pp. 10-17, 2003, a problem of an increase in computation volume is posed. Also, in case of the region segmentation method based on the split & merge method like in L. Chen, "The lambda-connected segmentation and the optimal algorithm for split-and-merge segmentation", Chinese J. Computers, 14 (1991), pp. 321-331, a method of stably judging whether or not low-order feature amounts in a predetermined region have uniform properties during the division process has not been established yet, and precise region segmentation cannot be attained. Also, as in X. Ren, J. Malik, "Learning a classification model for segmentation", Proc. IEEE International Conference on Computer Vision, pp. 10-17, 2003, a problem of an increase in computation volume is posed.

SUMMARY OF THE INVENTION

In consideration of the aforementioned problems, the present invention provides a technique for shortening a processing time required for region segmentation of an image.

According to one aspect of the present invention, there is provided an information processing apparatus comprising: a setting unit configured to set a plurality of local regions on an image; an extraction unit configured to extract feature amounts from the respective local regions; a calculation unit configured to calculate dissimilarities between the local regions based on probability densities for the respective feature amounts; and an integration unit configured to integrate the plurality of local regions as region groups based on the dissimilarities.

According to one aspect of the present invention, there is provided a control method for an information processing apparatus, comprising: setting a plurality of local regions on an image; extracting feature amounts from the respective local regions; calculating dissimilarities between the local regions based on probability densities for the respective feature amounts; and integrating the plurality of local regions as region groups based on the dissimilarities.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

The first embodiment will be described below with reference to FIGS. 1 to 4. The first embodiment will explain a case in which based on a dissimilarity between local regions (first and second local regions) which are set at different positions on one image, the local regions are integrated as a region group.

Figure 1:
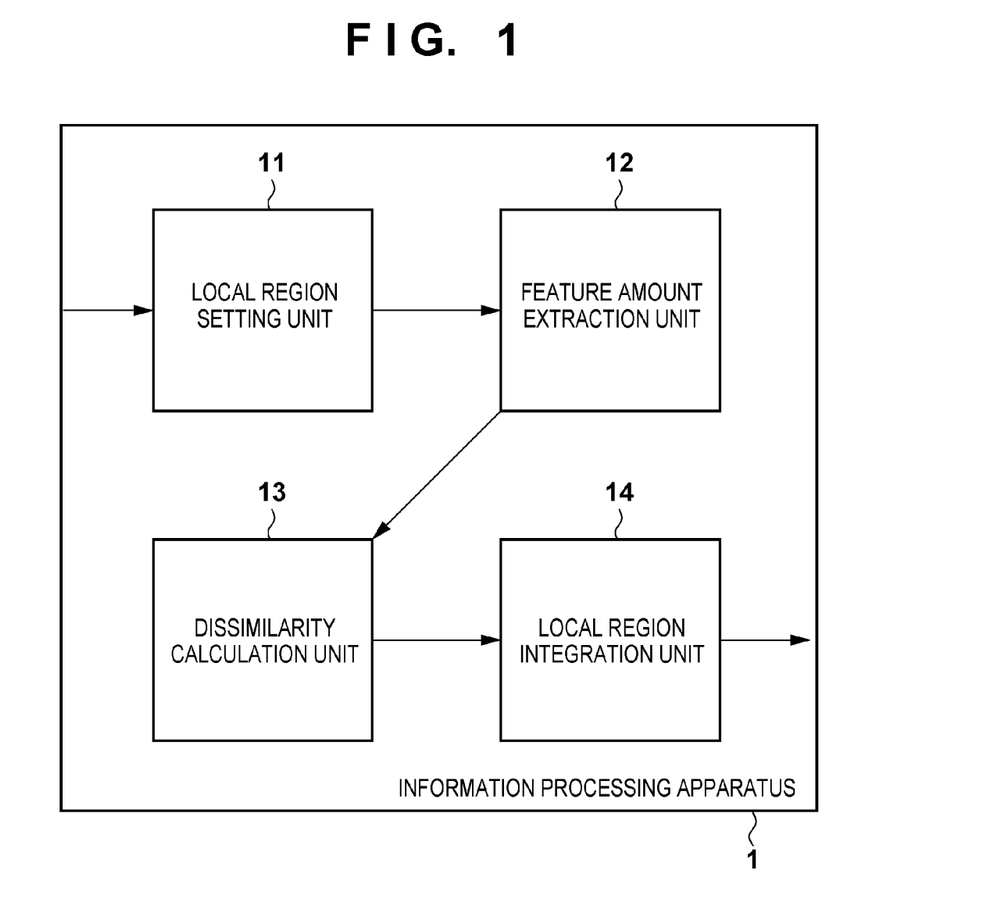
FIG. 1 is a block diagram showing the functional arrangement of an information processing apparatus according to the first embodiment.

FIG. 1 is a schematic block diagram showing the arrangement of an information processing apparatus 1 according to the first embodiment. The information processing apparatus according to this embodiment is implemented using a semiconductor integrated circuit (LSI). As shown in FIG. 1, the information processing apparatus 1 includes a local region setting unit 11, feature amount extraction unit 12, dissimilarity calculation unit 13, and local region integration unit 14. These components respectively correspond to functions executed by the information processing apparatus 1, and the operations of the components are implemented when a CPU (not shown) executes programs.

Note that the functions to be executed by the information processing apparatus 1 are roughly classified into two functions. One function is that of dividing an image into local regions, and is executed using the local region setting unit 11. The other function is an integration function of integrating divided local regions to classify integrated local regions into some set regions, and is executed using the feature amount extraction unit 12, dissimilarity calculation unit 13, and local region integration unit 14.

The region segmentation result obtained using the information processing apparatus 1 is transferred to an upper layer of the information processing apparatus 1, and is applied to various image processing applications.

Figure 2:
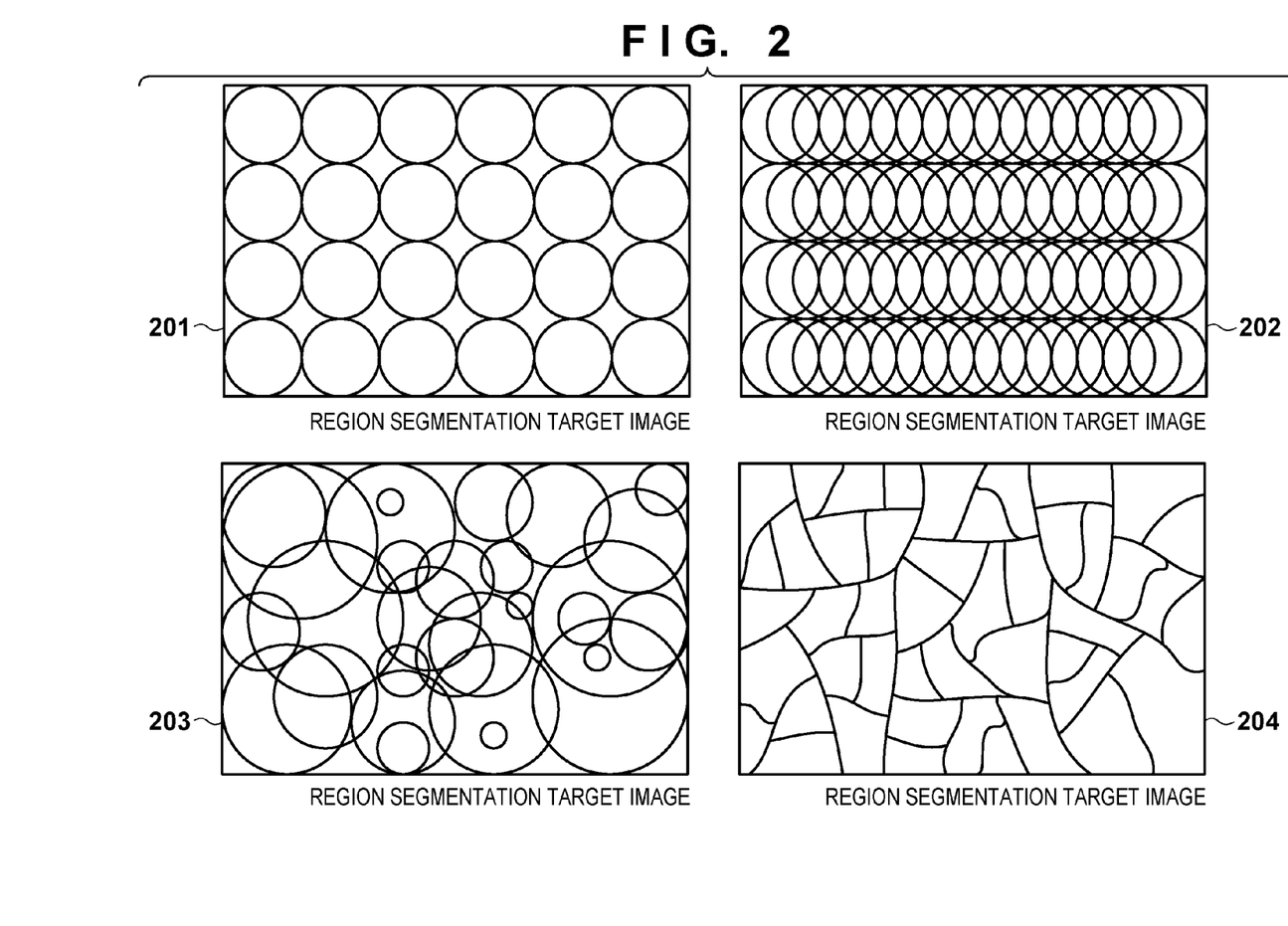
FIG. 2 is a view for explaining the function of a local region setting unit 11 of the information processing apparatus according to the first embodiment.

The local region setting unit 11 sets a plurality of local regions in a region segmentation target image input from a device outside the information processing apparatus 1, as denoted by reference numerals 201 to 204 in FIG. 2.

In this case, the local region setting unit 11 sets local regions by arranging circular regions each having a given size to be adjacent to each other, as denoted by reference numeral 201. Alternatively, the local region setting unit 11 may set local regions by arranging circular regions each having a given size at equal intervals to partially overlap each other, as denoted by reference numeral 202. Alternatively, the local region setting unit 11 may set local regions by randomly arranging circular regions having arbitrary sizes, as denoted by reference numeral 203.

Alternatively, the local region setting unit 11 may set local regions by dividing an image based on statistical distribution differences of low-dimensional feature amounts (luminance values, color components, edge intensities, textures, or the like) in the image, as denoted by reference numeral 204. Alternatively, the local region setting unit 11 may set local regions using Segmentation by Weighted Aggregation (SWA) in E. Sharon, A. Brandt, and R. Basri, "Fast multiscale image segmentation", Proc. IEEE Computer Vision and Pattern Recognition, pp. 70-77, 2000. Alternatively, the local region setting unit 11 may set local regions by receiving positions, shapes, sizes, numbers, and the like of local regions from the upper layer of the information processing apparatus 1.

The feature amount extraction unit 12 randomly extracts low-dimensional feature amounts from the respective local regions set by the local region setting unit 11. In this case, types (luminance values, edge intensities, textures, and the like) and the numbers of low-dimensional feature amounts to be extracted are received in advance from the upper layer of the information processing apparatus 1 in accordance with characteristics of an input image.

Figure 3:
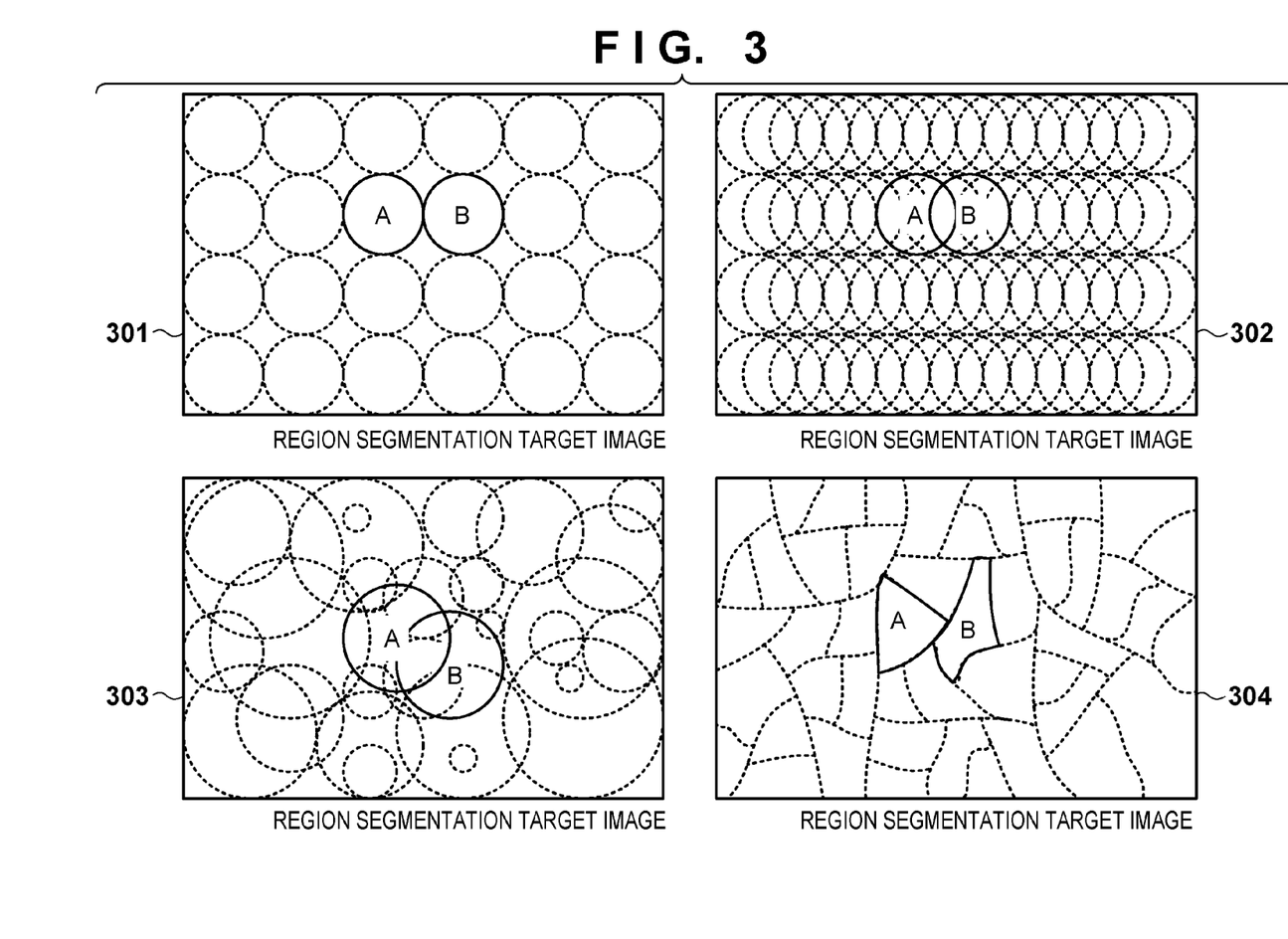
FIG. 3 is a view for explaining the function of a dissimilarity calculation unit 13 of the information processing apparatus according to the first embodiment.

The dissimilarity calculation unit 13 calculates a dissimilarity D between two spatially neighboring local regions set by the local region setting unit 11, that is, a local region A (first local region) and local region B (second local region) based on statistical distribution differences of the low-dimensional feature amounts extracted by the feature extraction unit 12, as denoted by reference numerals 301 to 304 in FIG. 3.

More specifically, the dissimilarity calculation unit 13 calculates the dissimilarity D based on a ratio of probability densities estimated using the low-dimensional feature amounts acquired from one local region A and those acquired from the other local region B.

Note that a density ratio ($R = p_A/p_B$) of a probability density $p_A$ of low-dimensional feature amounts in one local region A and a probability density $p_B$ of low-dimensional feature amounts in the other local region B can be calculated using, for example, a density ratio estimation method (Kullback-Leibler Importance Estimation Procedure) described in Hido, S., Tsuboi, Y., Kashima, H., Sugiyama, M., & Kanamori, T. "Statistical outlier detection using direct density ratio estimation", Knowledge and Information Systems, to appear.

Alternatively, the density ratio ($R = p_A/p_B$) may be calculated using, for example, a density ratio estimation method (Unconstrained Least-Squares Importance Fitting) described in T. Kanamori, S. Hido, and M. Sugiyama, "A least-squares approach to direct importance estimation", Journal of Machine Learning Research, 10:1391-1445, July 2009.

In these methods described in Hido, S., Tsuboi, Y., Kashima, H., Sugiyama, M., & Kanamori, T., "Statistical outlier detection using direct density ratio estimation", Knowledge and Information Systems, to appear. and T. Kanamori, S. Hido, and M Sugiyama, "A least-squares approach to direct importance estimation", Journal of Machine Learning Research, 10:1391-1445, July 2009, using the low-dimensional feature amounts acquired from the local region A as training data, and also those acquired from the local region B as validation data, model parameters for density ratio estimation are determined by a cross-validation method, thus attaining density ratio estimation.

These density ratio estimation methods avoid direct calculations of probability densities for low-dimensional feature amounts in the respective local regions to calculate a similarity between the two local regions, and directly calculate a ratio between the probability densities based on the low-dimensional feature amounts in the respective local regions. For this reason, a similarity between the two local regions can be stably calculated.

Using these density ratio estimation methods, the dissimilarity D is given by a reciprocal $1/\sigma$ of a standard deviation $\sigma$ of the density ratio R when the feature amount extraction unit 12 extracts low-dimensional feature amounts of only one type (for example, only luminance values Y).

On the other hand, when the feature amount extraction unit 12 extracts low-dimensional feature amounts of a plurality of types (for example, three types, that is, luminance values Y, edge intensities E, and textures T), using a linear sum of reciprocals ($1/\sigma_Y$, $1/\sigma_E$, $1/\sigma_T$) of standard deviations ($\sigma_Y$, $\sigma_E$, $\sigma_T$) of the density ratios R based on the respective low-dimensional feature amounts, the dissimilarity D is given by:

$$D = \frac{1}{\sigma_Y} + \frac{1}{\sigma_E} + \frac{1}{\sigma_T} \tag{1}$$

Furthermore, when the feature amount extraction unit 12 extracts low-dimensional feature amounts of a plurality of types (for example, N types), equation (1) can be easily expanded, and the dissimilarity D is given by:

$$D = \frac{1}{\sigma_0} + \frac{1}{\sigma_1} + \ldots + \frac{1}{\sigma_n} + \ldots \frac{1}{\sigma_N} \quad (2)$$

Alternatively, more generally, the dissimilarity D may be given as a nonlinear function about $\sigma_n$ (n=0 to N), as described by:

$$D = f(\sigma_0, \sigma_1, \ldots \sigma_n, \ldots, \sigma_N) \quad (3)$$

Note that the dissimilarity calculation unit 13 calculates dissimilarities D between all neighboring local regions set by the local region setting unit 11, and outputs them to the local region integration unit 14. The local region integration unit 14 integrates the local regions set by the local region setting unit 11 into a plurality of clusters based on the dissimilarities D each between two spatially neighboring local regions obtained by the dissimilarity calculation unit 13.

More specifically, when the dissimilarity D between the two spatially neighboring local regions is smaller than a predetermined threshold T, the local region integration unit 14 integrates these two local regions. On the other hand, when the dissimilarity D between the two neighboring local regions is equal to or larger than the predetermined threshold T, the local region integration unit 14 does not integrate these two local regions to let them in a distinguished state.

Figure 4:
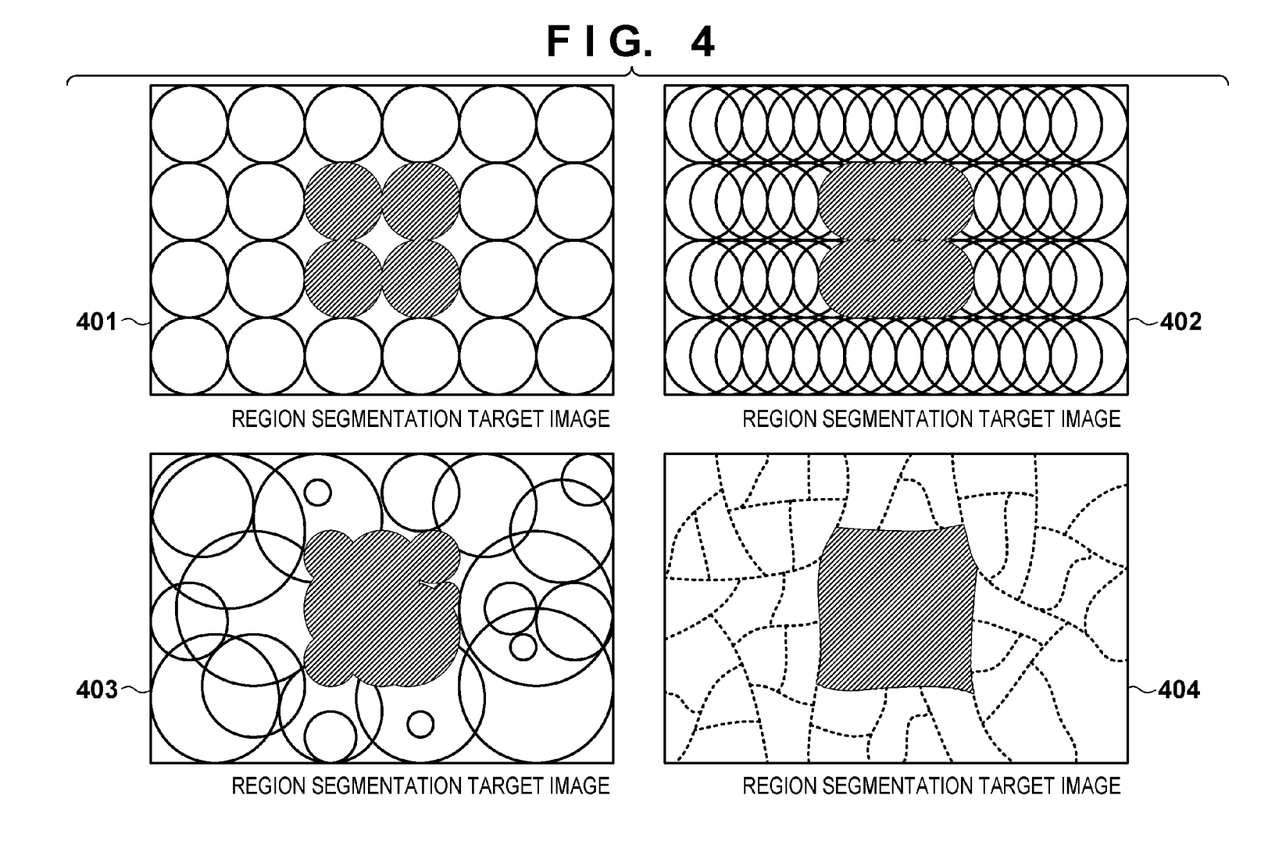
FIG. 4 is a view for explaining the function of a local region integration unit 14 of the information processing apparatus according to the first embodiment.

By executing this processing to all the neighboring local regions, the local region integration unit 14 generates clusters, as denoted by reference numerals 401 to 404 in FIG. 4. A local region group in the same color (black in this case) represents a cluster of local regions which contain similar low-dimensional feature amounts. In this case, the respective clusters denoted by reference numerals 401 to 404 in FIG. 4 respectively correspond to the region segmentations using the local regions denoted by reference numerals 201 to 204 in FIG. 2. Note that the predetermined threshold T is received in advance from the upper layer of the information processing apparatus 1 according to characteristics of an input image.

The region segmentation result obtained in this way is transferred to the upper layer of the information processing apparatus 1 to have, as the upper layer, for example, a CPU in a digital still camera which controls the information processing apparatus 1, under the assumption that object categories included in respective regions obtained by region segmentation are to be specified, and image quality of a predetermined object category is to be enhanced in the digital still camera.

As described above, according to this embodiment, a processing time required for the region segmentation of an image can be shortened, and the subsequent processes using the region segmentation result can be efficiently executed.

(Second Embodiment)

The second embodiment will be described below with reference to FIG. 1 and FIGS. 5 to 9. In this embodiment, only differences from the first embodiment will be explained.

In the second embodiment, local regions (first and second local regions) are respectively set at corresponding positions on two temporally neighboring different images, for example, two temporally continuous frame images which form a moving image. Likewise, local regions (third and fourth local regions) are respectively set at corresponding positions on the above two different images. In this case, these positions are different from those on the images at which the first and second local regions are set. More specifically, the first and third local regions are set on a first image, and the second and fourth local regions are set on a second image.

Then, a dissimilarity between the first and second local regions is calculated, and that between the third and fourth local regions is calculated. Then, in order to classify local regions into a local region group in which the dissimilarity between the two temporally neighboring local regions is equal to or larger than a threshold and that in which the dissimilarity is smaller than the threshold, the first and third local regions are integrated as a local region group, and the second and fourth local regions are integrated as a local region group. Note that the two local regions set on one image are integrated in this case, but two or more local regions may be set and integrated.

Figure 5:
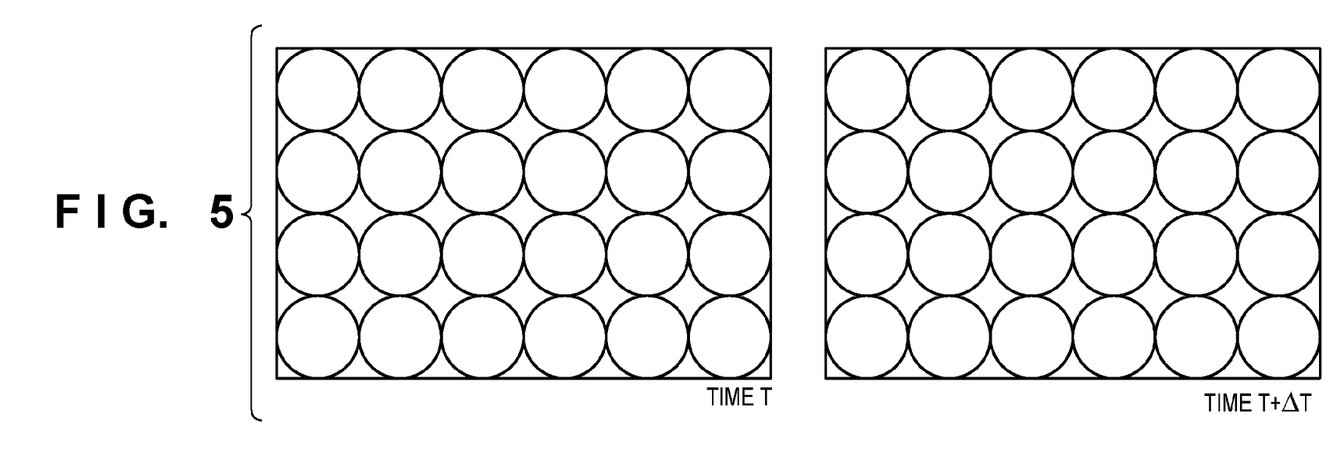
FIG. 5 is a view for explaining the function of the local region setting unit 11 of the information processing apparatus according to the second embodiment.

The processes of respective components of the information processing apparatus 1 according to this embodiment will be described below. The local region setting unit 11 sets a plurality of local regions on two temporally neighboring images clipped from a moving image, that is, an image at time T and that at time T+ΔT, as shown in FIG. 5.

Figure 6:
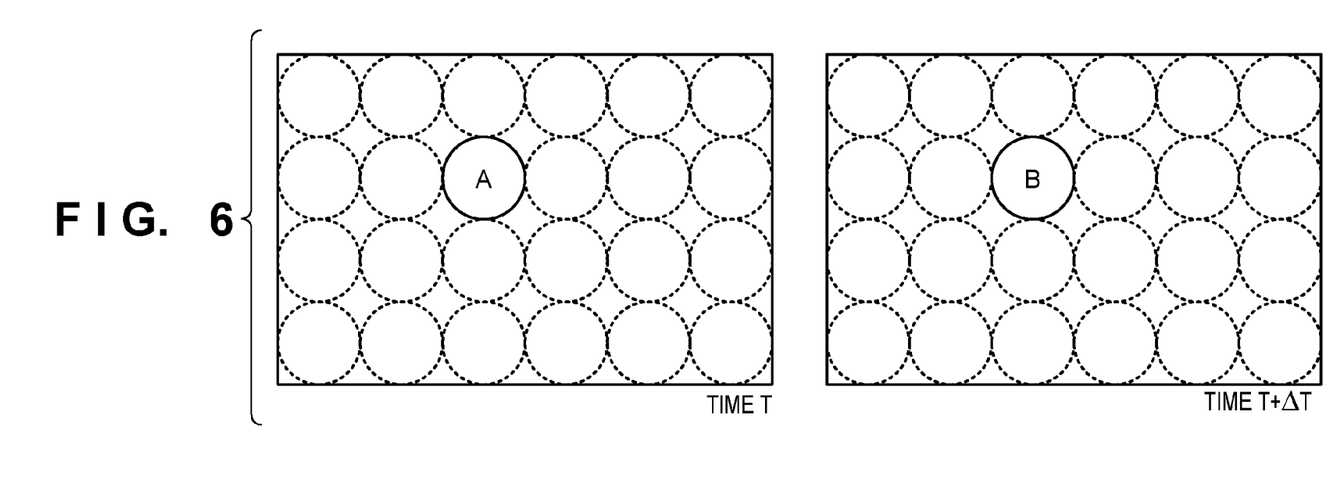
FIG. 6 is a view for explaining the function of the dissimilarity calculation unit 13 of the information processing apparatus according to the second embodiment.
Figure 7:
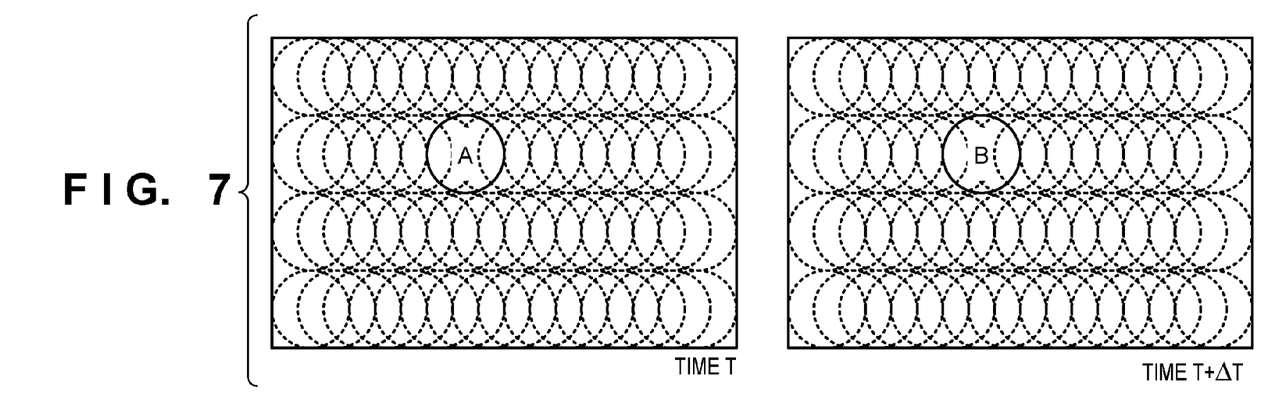
FIG. 7 is a view for explaining the function of the dissimilarity calculation unit 13 of the information processing apparatus according to the second embodiment.

In this case, the local region setting unit 11 sets local regions by arranging circular regions each having a given size to be adjacent to each other on two temporally neighboring images, as shown in FIG. 6. Alternatively, the local region setting unit 11 may set local regions by arranging circular regions each having a given size at equal intervals to partially overlap each other on two temporally neighboring images, as shown in FIG. 7.

Figure 8:
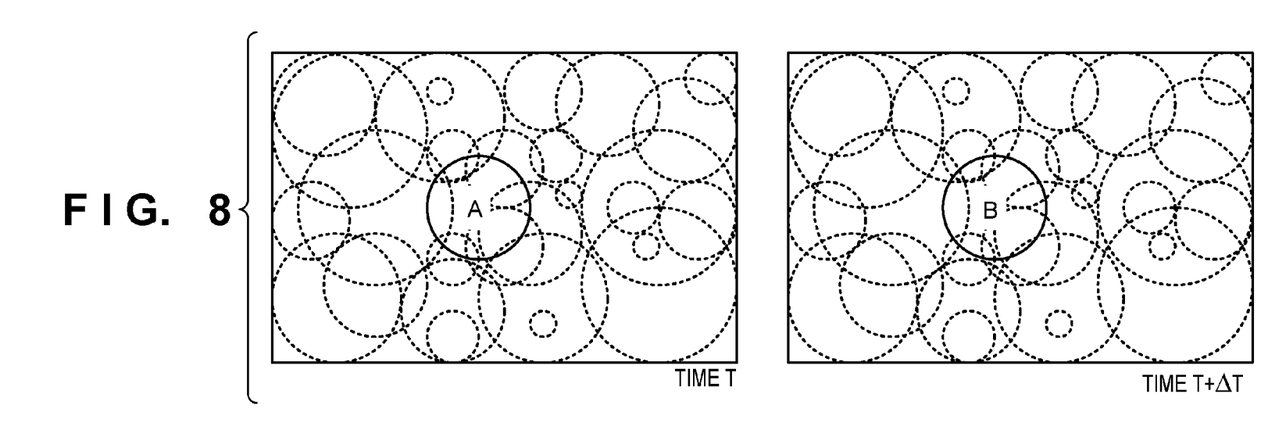
FIG. 8 is a view for explaining the function of the dissimilarity calculation unit 13 of the information processing apparatus according to the second embodiment.
Figure 9:
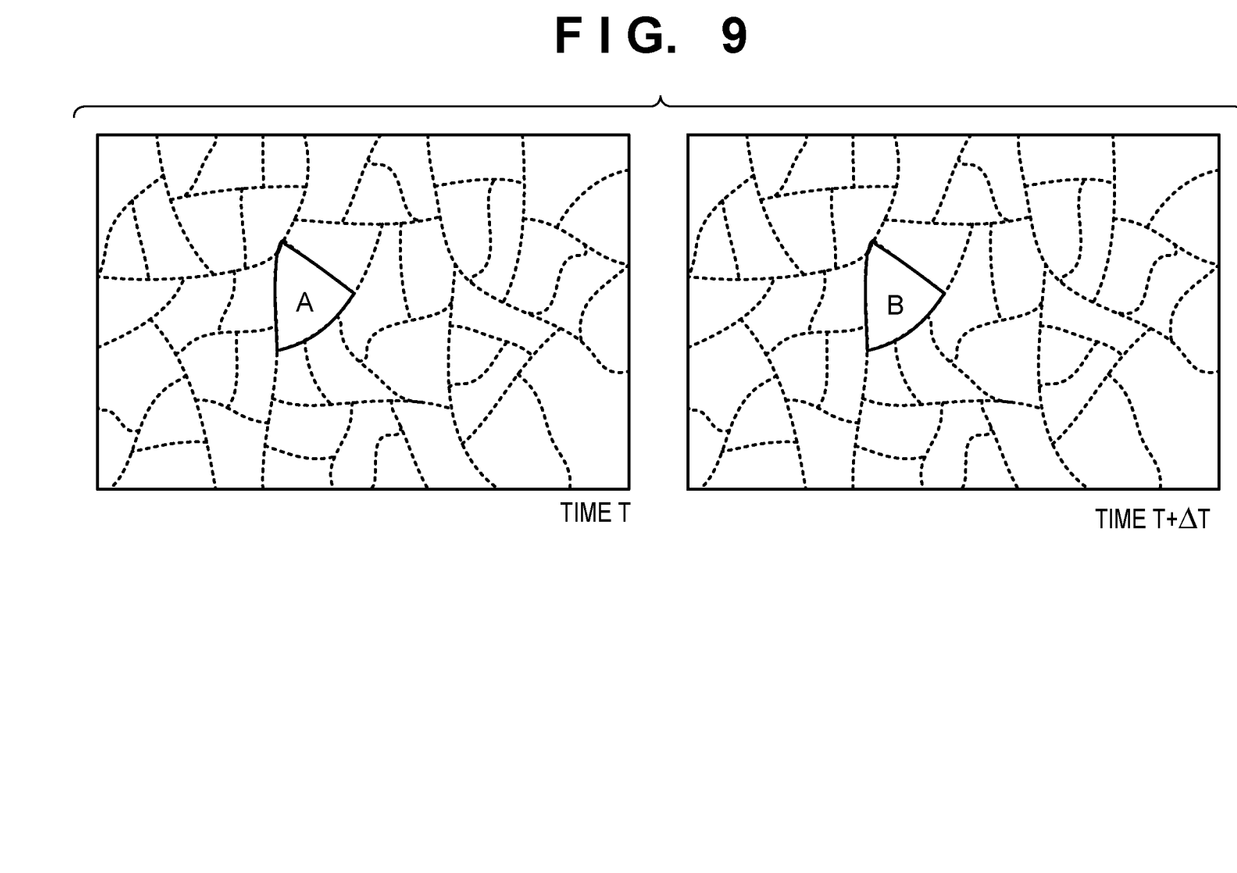
FIG. 9 is a view for explaining the function of the dissimilarity calculation unit 13 of the information processing apparatus according to the second embodiment.

Alternatively, the local region setting unit 11 may set local regions by randomly arranging circular regions having arbitrary sizes on two temporally neighboring images, as shown in FIG. 8. Alternatively, the local region setting unit 11 may set local regions by dividing two temporally neighboring images based on statistical distribution differences of low-dimensional feature amounts (luminance values, color components, edge intensities, textures, or the like) in the images, as shown in FIG. 9.

Alternatively, the local region setting unit 11 may set local regions on two temporally neighboring images using Segmentation by Weighted Aggregation (SWA) in E. Sharon, A. Brandt, and R. Basri, "Fast multiscale image segmentation", Proc. IEEE Computer Vision and Pattern Recognition, pp. 70-77, 2000. Alternatively, the local region setting unit 11 may set local regions by receiving positions, shapes, sizes, numbers, and the like of local regions from the upper layer of the information processing apparatus 1.

The dissimilarity calculation unit 13 calculates a dissimilarity D between a local region A on the image at time T and a local region B on the image at time T+ΔT, which are set by the local region setting unit 11, based on statistical distribution differences of low-dimensional feature amounts extracted by the feature amount extraction unit 12, as shown in FIGS. 6 to 9. Assume that the local regions A and B have the same spatial position in the images (two-dimensional position in the images) and the same size. In this case, a practical calculation method of the dissimilarity D is the same as the first embodiment.

The local region integration unit 14 integrates the local regions set by the local region setting unit 11 into a plurality of clusters based on the dissimilarities D each between the two temporally neighboring local regions obtained by the dissimilarity calculation unit 13.

More specifically, the local region integration unit 14 classifies the local regions into a local region group in which the dissimilarity D between the two temporally neighboring local regions is larger than a predetermined threshold T and that in which the dissimilarity D is equal to or smaller than the predetermined threshold T. By executing this processing to all temporally neighboring local regions, the local region integration unit 14 generates clusters, as denoted by reference numerals 401 to 404 in FIG. 4. In this case, a local region group in the same color (black in this example), which indicates that in which the dissimilarity D is larger than the predetermined threshold T, represents a cluster of local regions in which temporal changes of low-dimensional feature amounts are conspicuous. Note that the predetermined threshold T is received in advance from the upper layer of the information processing apparatus 1 according to characteristics of an input image.

The region segmentation result obtained in this way is transferred to the upper layer of the information processing apparatus 1 to have, as the upper layer, a CPU in a security camera which controls the information processing apparatus 1 under the assumption that, for example, respective regions obtained by the region segmentation are classified into moving objects and still objects, and categories (vehicle body, human, animal, and the like) of the moving objects are specified in the security camera. Therefore, moving objects and still objects can be classified, and categories (vehicle body, human, animal, and the like) of the moving objects can be efficiently specified.

(Third Embodiment)

The local region setting unit 11 in the first and second embodiments may use, as a local region, other arbitrary shapes such as an elliptic shape and rectangular shape in addition to the circular shape. The dissimilarity calculation unit 13 in the first and second embodiments may use, in place of equation (2), equation (4) which uses an area s of each local region, and is given by:

$$D = \frac{s^2}{2s+1} \cdot \left( \frac{\alpha_0}{\sigma_0} + \frac{\alpha_1}{\sigma_1} + \ldots + \frac{\alpha_n}{\sigma_n} + \ldots \frac{\alpha_N}{\sigma_N} \right) \quad (4)$$

where $\alpha_0, \alpha_1, \ldots, \alpha_n$, and $\alpha_N$ are constants which are determined in advance by machine learning. Also, $s^2/(2s+1)$ is a representative example of an experimentally adjusted function form, but the present invention is not limited to this function form. Alternatively, the dissimilarity calculation unit 13 in the first and second embodiments may use, in place of equation (2), equation (5) which uses an arbitrary function f(s) of an area s of each local region and is given by:

$$D = f(s) \cdot \left( \frac{\alpha_0}{\sigma_0} + \frac{\alpha_1}{\sigma_1} + \ldots + \frac{\alpha_n}{\sigma_n} + \ldots \frac{\alpha_N}{\sigma_N} \right) \quad (5)$$

As described above, according to the aforementioned embodiments, a processing time required for the region segmentation of an image can be shortened.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-200973 filed on Sep. 14, 2011, which is hereby incorporated by reference herein in its entirety.

What is claimed is:

1. An information processing apparatus comprising:
    a setting unit configured to set a plurality of local regions including at least first and second local regions on a first image and third and fourth local regions respectively corresponding to the positions of the first and second local regions on a temporally different second image;
    an extraction unit configured to extract feature amounts from the respective local regions;
    a calculation unit configured to calculate respective dissimilarities between the first and third local regions and between the second and fourth local regions based on, for each of pair of local regions, a ratio of probability densities of the feature amounts extracted from the local regions; and
    an integration unit configured to integrate the first and third local regions as a first region group and the second and fourth local regions as a second region group based on the dissimilarities.

2. The apparatus according to claim 1, wherein said setting unit sets the first local region and the second local region at different positions on one image.

3. The apparatus according to claim 2, wherein said extraction unit extracts feature amounts respectively from the first local region and the second local region, and
    said calculation unit calculates a dissimilarity between the first local region and the second local region based on a ratio of probability densities of the respective extracted feature amounts.

4. The apparatus according to claim 3, wherein said integration unit integrates the first local region and the second local region as a region group when the dissimilarity is smaller than a threshold.

5. The apparatus according to claim 1, wherein said integration unit integrates the first local region and the second local region as a third region group when the dissimilarity between the first local region and the third local region is smaller than a threshold and when the dissimilarity between the second local region and the fourth local region is smaller than the threshold.

6. The apparatus according to claim 5, wherein said integration unit further integrates the third local region and the fourth local region as a fourth region group when the dissimilarity between the first local region and the third local region is smaller than the threshold and when the dissimilarity between the second local region and the fourth local region is smaller than the threshold.

7. The apparatus according to claim 1, wherein the first image and the second image are two temporally neighboring images.

8. A control method for an information processing apparatus, comprising:
    setting a plurality of local regions on an image including at least first and second local regions on a first image and third and fourth local regions respectively corresponding to the positions of the first and second local regions on a temporally different second image;
    extracting feature amounts from the respective local regions;
    calculating respective dissimilarities between the first and third local regions and between the second and fourth local regions based on, for each of pair of local regions, a ratio of probability densities of the feature amounts extracted from the local regions; and integrating the first and third local regions as a first region group and the second and fourth local regions as a second region group based on the dissimilarities.

9. A non-transitory computer-readable storage medium storing a computer program for controlling a computer to execute respective steps of a control method of an information processing apparatus of claim 8.

* * * * *